(12) United States Patent
Richey (10) Patent No.: US 11,029,136 B2
(45) Date of Patent: Jun. 8, 2021

(54) MAGNETIC TAPE MEASURE MOUNT

(71) Applicant: Brian Richey, Arroyo Grande, CA (US)

(72) Inventor: Brian Richey, Arroyo Grande, CA (US)

(*) Notice: Subject to any disclaimer, the term of this patent is extended or adjusted under 35 U.S.C. 154(b) by 184 days.

(21) Appl. No.: 16/282,668

(22) Filed: Feb. 22, 2019

(65) Prior Publication Data

US 2019/0257634 A1 Aug. 22, 2019

Related U.S. Application Data

(60) Provisional application No. 62/633,872, filed on Feb. 22, 2018.

(51) Int. Cl.
*G01B 3/1071* (2020.01)
*G01B 3/1041* (2020.01)
*G01B 3/1048* (2020.01)

(52) U.S. Cl.
CPC ......... *G01B 3/1071* (2013.01); *G01B 3/1041* (2013.01); *G01B 3/1048* (2020.01); *G01B 2003/1074* (2013.01)

(58) Field of Classification Search
CPC ...... G01B 3/10; G01B 3/1003; G01B 3/1071; G01B 3/1048; G01B 3/1041; G01B 3/1046
USPC ......... 33/769, 760, 755, 758, 761, 768, 770, 33/DIG. 1
See application file for complete search history.

(56) References Cited

U.S. PATENT DOCUMENTS

| | | | | |
|---|---|---|---|---|
| 5,025,966 A * | 6/1991 | Potter | ............... | A45F 5/02 224/183 |
| 5,213,240 A * | 5/1993 | Dietz | ............... | A45F 5/02 224/183 |
| 5,230,159 A * | 7/1993 | Lipsey | ............... | G01B 3/1084 33/760 |
| 6,161,741 A * | 12/2000 | French | ............... | F41C 33/0227 224/192 |
| 6,502,727 B1* | 1/2003 | Decoteau | ............... | A45F 5/004 224/162 |
| 10,736,406 B2* | 8/2020 | Hintze | ............... | A45F 5/004 |
| 2003/0167651 A1* | 9/2003 | Pedersen | ............... | G01B 3/1071 33/758 |
| 2005/0145656 A1* | 7/2005 | Knight | ............... | A45F 5/021 224/162 |
| 2005/0268480 A1* | 12/2005 | Potter | ............... | G01B 3/1056 33/768 |
| 2013/0055578 A1* | 3/2013 | Johns | ............... | G01B 3/1084 33/760 |
| 2013/0126541 A1* | 5/2013 | Woolery | ............... | G01B 3/1071 220/751 |
| 2014/0020256 A1* | 1/2014 | Rubin | ............... | B43L 1/008 33/760 |
| 2018/0120074 A1* | 5/2018 | Orsini | ............... | G01B 3/1071 |

* cited by examiner

*Primary Examiner* — Christopher W Fulton
(74) *Attorney, Agent, or Firm* — The Roy Gross Law Firm, LLC; Roy Gross (57) ABSTRACT

Systems and methods for manufacturing, implanting and using a magnetic tape measure mount to secure a tape measure or other related instrument magnetically to a user, to a user's belt, or work belt.

16 Claims, 13 Drawing Sheets

MAGNETIC TAPE MEASURE MOUNT

CROSS REFERENCE TO RELATED APPLICATIONS

This application claims priority to U.S. Provisional Application No. 62/633,872 filed Feb. 22, 2018. The contents of this application are incorporated by referenced into this application as if set forth in their entirety.

FIELD OF THE INVENTION

The present invention is directed to systems and methods for manufacturing, implanting and using a magnetic tape measure mount to secure a tape measure or other related instrument magnetically to a user, to a user's waistline/belt line, or work belt.

BACKGROUND OF THE INVENTION

Tape measures are used for many industrial and construction jobs. Often a construction foreman and workers carry a tape measure in order to measure the dimensions of the job and its components, especially if the job involves carpentry, woodworking or construction where measurements are required to be precise and defined.

Disadvantageously however, current tape measures are often lost or are inaccessible during a job when they are needed. For example, when working on a ladder, and when a worker is required to hold multiple tools, tape measures are often forgotten or left behind, thus, requiring the user to descend from the ladder and find a tape measure. This often wastes time and is inefficient.

Existing systems for tape measure designs include: U.S. Pat. Nos. 9,167,884, 9,038,873, 8,966,778, 8,516,621, 8,499,986, 8,499,943, 8,403,140, 7,971,277, 7,431,251, 7,374,142, 7,322,068, 7,269,869, 7,114,592, 7,076,885, 6,824,028, 6,685,067, 6,658,756, 6,502,727, 6,457,252, 6,401,253, 6,267,277, 6,161,741, 6,149,116, 5,213,240, 5,025,966, 4,736,877, 3,233,802, US337100, US20140020256, US20130126541, US20110308048, US20110005944, US20100095427, US20100025442, US20040232291, US20050145656, US20050268480, US20070099469, US20090094801, US20090095785, US20090145938 and US20090314813.

However, no existing system provides a tape measure mount that is magnetically mounted to offer increased ease of access to the tape measure.

Accordingly, it is desired to provide a method and system that solves the disadvantages in the prior art.

SUMMARY OF THE INVENTION

It is an object of the present invention to provide a magnetically mounted tape measure that attaches to a user, to a user's waistline/belt line, or work belt.

It is another object of the present invention to provide methods and systems for manufacturing, implanting and using a magnetic tape measure mount to secure a tape measure or another related instrument magnetically to a user.

It is another object of the present invention to provide a mounting device that is adapted to retrofit conventional tape measures to be magnetically mounted.

These and other objects of the invention are achieved by providing a magnetic tape measure mount, comprising: a housing having a magnet encompassed within the housing; a fastening device configured to fasten the housing to the tape measure; and a metal mounting plate, the magnet configured to be attached to the metal mounting plate to secure the housing and tape measure to the metal mounting plate.

In certain embodiments, the metal mounting plate includes a clip configured to attach the metal mounting plate to a user's belt line, utility belt and/or pocket.

In certain embodiments, the clip is welded or riveted to the metal mounting plate. In certain embodiments, the clip is attached via a fastening device to the mounting plate. In certain embodiments, the fastening device includes 2 recessed flat head screws with nuts and/or lockwashers.

In certain embodiments, the metal mounting plate includes a ridge at the bottom of the metal mounting plate, so that the housing is secured against the metal mounting plate and is held in place by the ridge to prevent the tape measure from rotating, being dislodged or sliding off if it happens to be placed too low on the plate.

In certain embodiments, the ridge extends perpendicularly to the metal mounting plate.

In certain embodiments, the ridge extends and completely surrounds a tape measure.

In certain embodiments, the magnet has a doughnut shape.

In certain embodiments, the proximal side of the housing abuts the tape measure, and the distal side of the housing faces the metal mounting plate.

In certain embodiments, the metal mounting plate has a surface area larger than the magnet.

In certain embodiments, the fastening device is a screw.

In certain embodiments, the metal mounting plate is round.

In certain embodiments, the housing includes a washer-type shape.

In certain embodiments, the magnet includes enough strength to attach to the metal mounting plate during use and wear of the tape measure.

Other objects of the invention are achieved by providing a kit to retrofit an existing tape measure, the kit comprising: a housing having a magnet encompassed within the housing; a fastening device configured to fasten the housing to an existing tape measure; and a metal mounting plate, the magnet configured to be attached to the metal mounting plate to secure the housing and tape measure to the metal mounting plate.

Other objects of the invention are achieved by providing a method to retrofit an existing tape measure to be magnetically mounted, the method comprising: providing a tape measure having a clip; unscrewing the clip from the tape measure, providing a magnetic tape measure mount comprising: a housing having a magnet encompassed within the housing, a fastening device configured to fasten the housing to the tape measure, and a metal mounting plate, the magnet configured to be attached to the metal mounting plate to secure the housing and tape measure to the metal mounting plate; and securing the magnetic tape measure mount to the tape measure.

Other objects of the invention are achieved by providing a magnetic tape measure mount, comprising: a first housing having a first magnet encompassed within the first housing; a fastening device configured to fasten the first housing to the tape measure; and a belt clip assembly comprising an upper portion and a lower portion, the lower portion comprising a second magnet, and wherein the first and second magnet are configured to be attracted to each other and self-center the tape measure to the second magnet.

In certain embodiments, the mount further comprises an arc-shaped shroud located on an upper portion of the first housing; and a second housing for the second magnet, the second housing comprising an arc shaped tab, the arc shaped tab of substantially similar size as the arc-shaped shroud, and the arc-shaped tab forming a recess with a surface of the lower portion of the belt clip assembly, and within which a portion of the shroud can interface and interlock with.

In certain embodiments, the upper portion of the belt clip assembly is formed at an angle in regard to the lower portion.

In certain embodiments, the belt clip assembly comprises a clip attached to the upper portion and configured to attach the belt clip assembly to a user's waistline/belt line or work belt.

In certain embodiments, the first housing is substantially cylindrical in shape, and configured to accept the first magnet within an interior portion of the first housing.

Other embodiments of the invention are achieved by providing a magnetic tape measure mount, comprising: a first housing having a first magnet encompassed within the first housing; a belt clip assembly comprising an upper portion and a lower portion, the first housing attached to the lower portion; a shroud plate configured to be attached to the tape measure, the shroud plate comprising an arc-shaped shroud located on an upper portion of the shroud plate and configured to receive the first housing when the tape measure is attached to the first magnet.

In certain embodiments, the upper portion of the belt clip assembly is formed at an angle in regard to the lower portion.

In certain embodiments, the belt clip assembly comprises a clip attached to the upper portion and configured to attach the belt clip assembly to a user's waistline/belt line or work belt.

In certain embodiments, the first housing is substantially cylindrical in shape, and configured to accept the first magnet within an interior portion of the first housing.

Other embodiments of the invention are achieved by providing a tape measure safety mounting assembly comprising: a keeper plate comprising a hole; a clasp attached to the tape measure; and a safety clip assembly configured to attach to the clasp on the tape measure and to attach to the hole on the keeper plate such that the tape measure is attached to the keeper plate by the safety clip assembly.

In certain embodiments, the keeper plate is further configured to be removably attachable to an article of clothing of a user.

In certain embodiments, the keeper plate comprises a clip attached to a first side of the keeper plate.

In certain embodiments, the clip is located at an upper portion of the keeper plate.

In certain embodiments, the hole is located at a lower portion of the keeper plate.

In certain embodiments, the safety clip assembly comprises: a first and second spring loaded safety clip, the first and second spring loaded safety clips connected by a cable.

In certain embodiments, the tape measure safety mounting mechanism further comprises a magnet attached to the tape measure; and a ridge located on a lowermost portion of the keeper plate.

In certain embodiments, the ridge is configured to maintain spacing between the tape measure and the hole to which the safety clip assembly is attached.

In certain embodiments, the ridge is configured to prevent the tape measure from being dislodged and/or rotating.

In certain embodiments, the ridge extends perpendicularly to the keeper plate.

In certain embodiments, the ridge completely surrounds the tape measure.

In certain embodiments, the magnet has a doughnut shape.

In certain embodiments, the magnet includes enough strength to attach to the keeper plate during use and wear of the tape measure.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 20A-22 illustrate a further embodiment of the invention.

DETAILED DESCRIPTION OF THE INVENTION

In the following description, numerous details are set forth for the purpose of explanation. However, one of ordinary skill in the art will realize that the invention may be practiced without the use of these specific details.

This application incorporates by reference the disclosure in the Appendix accompanying the application.

In certain embodiments, the inventive method and system comprises a magnetically mounted tape measure that attaches to the waistline/belt line, or work belt of a user.

In certain embodiments, the inventive method and system are for manufacturing, implanting and using a magnetic tape measure mount to secure a tape measure or other related instrument magnetically to a user.

In certain embodiments, a mounting device is provided that is adapted to retrofit conventional tape measures to be magnetically mounted.

These and other objects of the invention are achieved by providing a magnetic tape measure mount, comprising: a housing having a magnet encompassed within the housing; a fastening device configured to fasten the housing to the tape measure; and a metal mounting plate, the magnet configured to be attached to the metal mounting plate to secure the housing and tape measure to the metal mounting plate.

In certain embodiments, the inventive method and system is capable of retrofitting an existing tape measure to be magnetically mounted.

Figure 1:
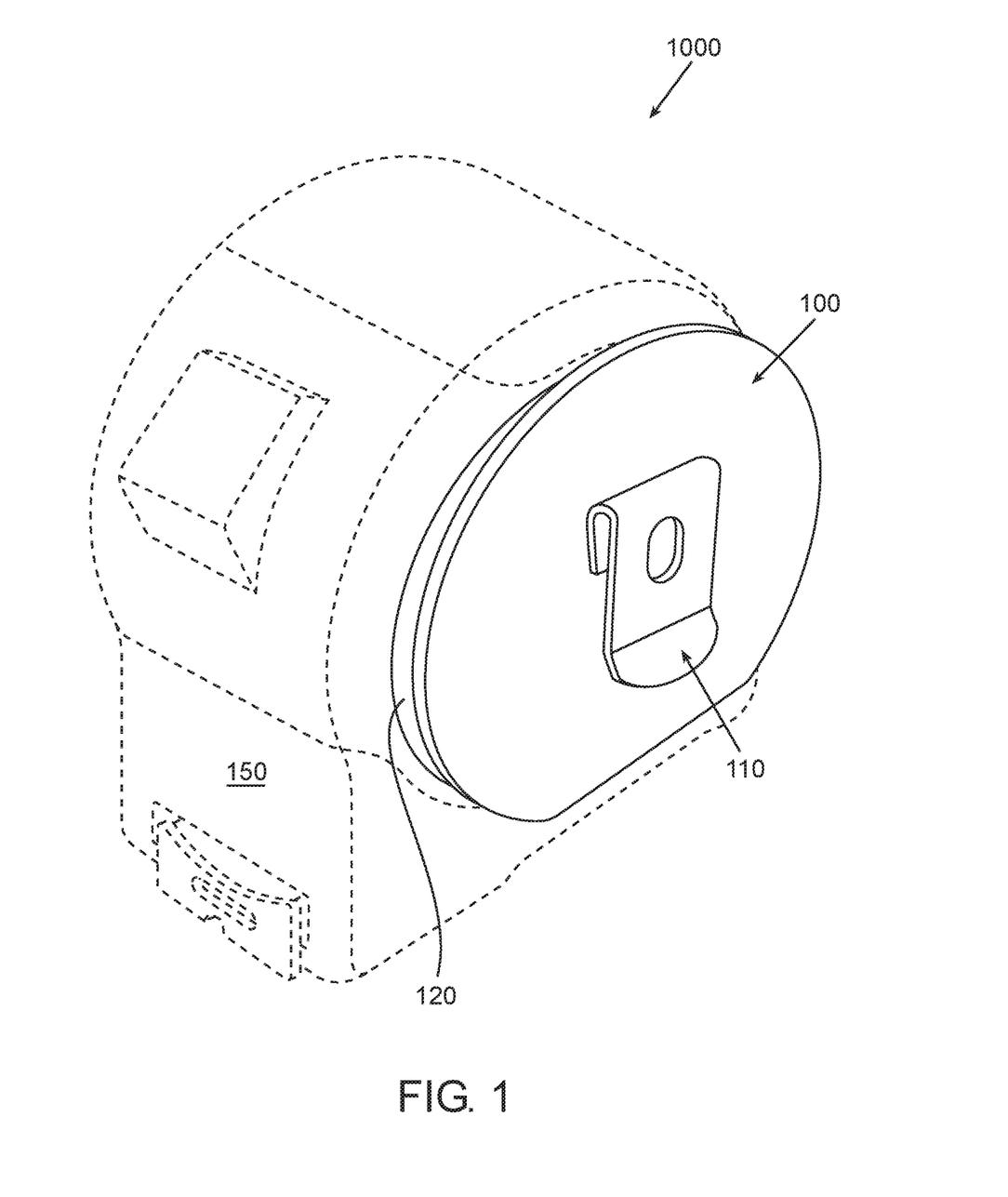
FIG. 1 is a front isometric view of an embodiment of the invention.
Figure 2:
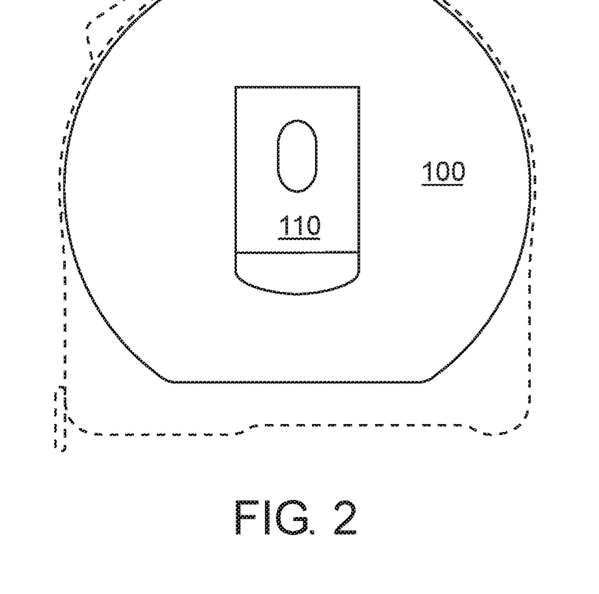
FIG. 2 is a front view of FIG. 1.
Figure 3:
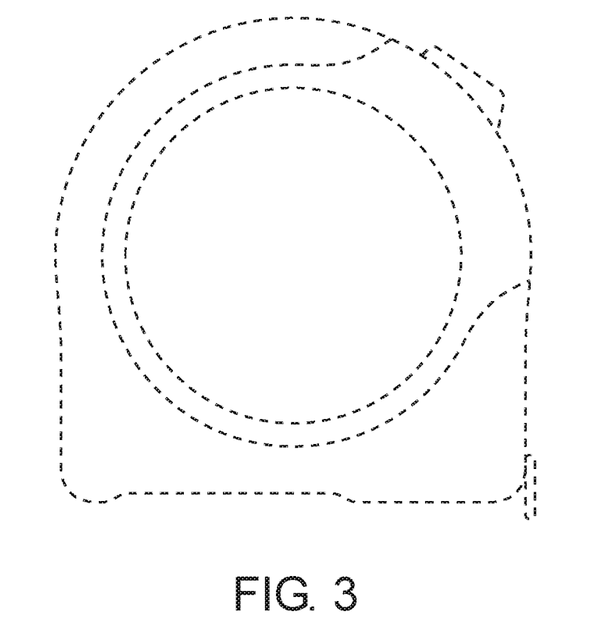
FIG. 3 is a rear view of FIG. 1.
Figure 4:
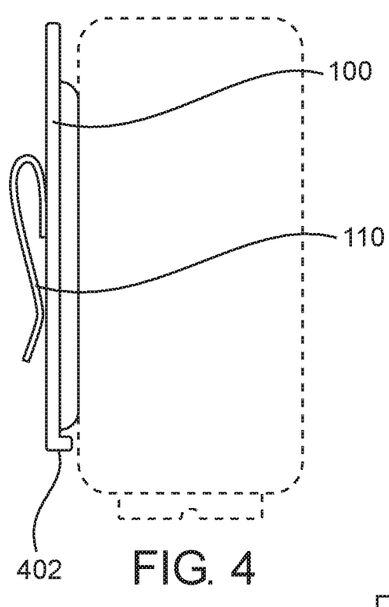
FIG. 4 is a right-side view of FIG. 1.
Figure 5:
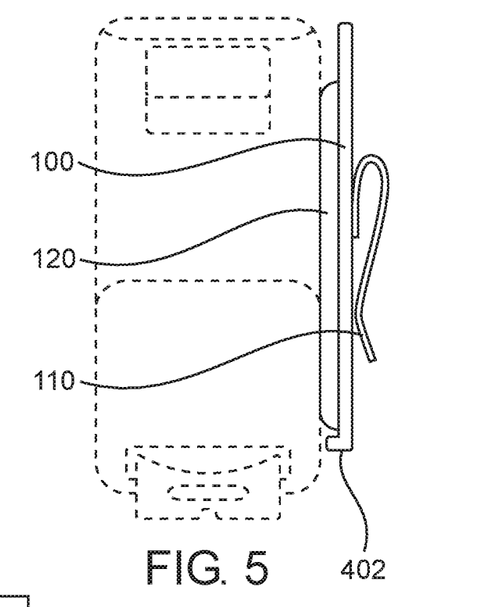
FIG. 5 is a left side view of FIG. 1.
Figure 6:
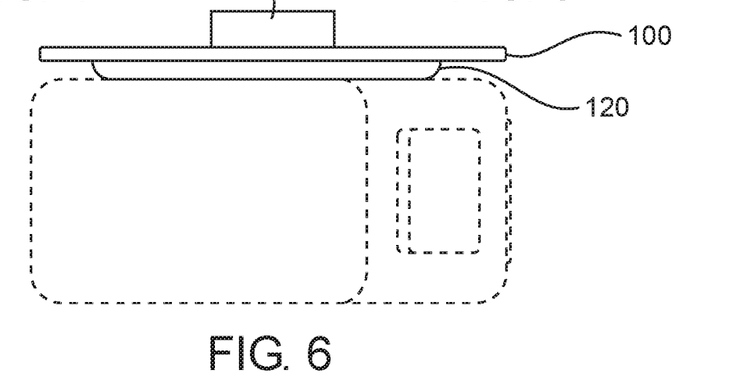
FIG. 6 is a top view of FIG. 1.
Figure 7:
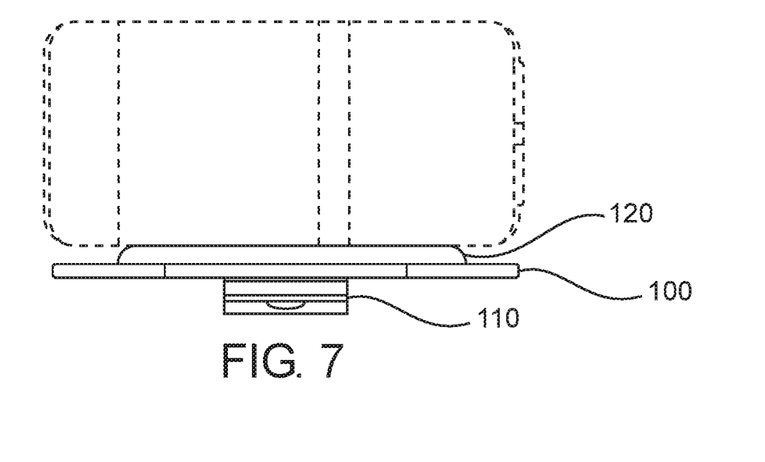
FIG. 7 is a bottom view of FIG. 1.
Figure 14:
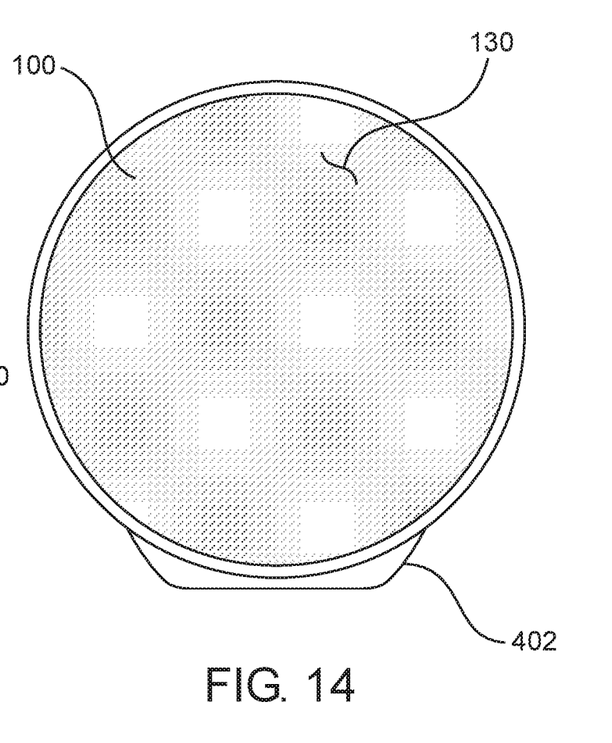
FIG. 14 illustrates a front view of a housing within which a magnet can be located with respect to the embodiment as shown in FIG. 1.
Figure 15:
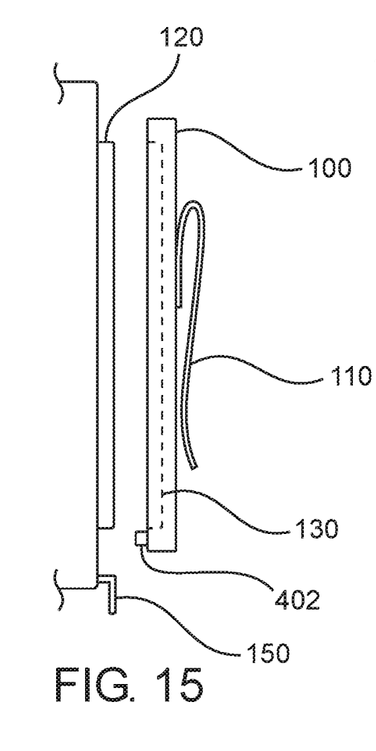
FIG. 15 illustrates a side view of a tape measure, a metal mounting plate, a clip, and a housing within which a magnet can be located with respect to the embodiment as shown in FIG. 1.

As depicted in FIGS. 1-7, and 14-15, an embodiment of the invention is shown. Metal mounting plate 120, which is connected to tape measure 150, is shown connected to housing 100 that includes magnet 130. A clip 110 is shown welded to housing 100. FIG. 14 illustrates a front view of housing 100 within which magnet 130 can be located with respect to the embodiment as shown in FIG. 1, and FIG. 15 illustrates a side view of tape measure 150, metal mounting plate 120, clip 110, and housing 100 within which magnet 130 can be located with respect to the embodiment as shown in FIG. 1. Housing 110 further comprises ridge 402 as shown in FIGS. 4, 5, 14, and 15.

Figure 8:
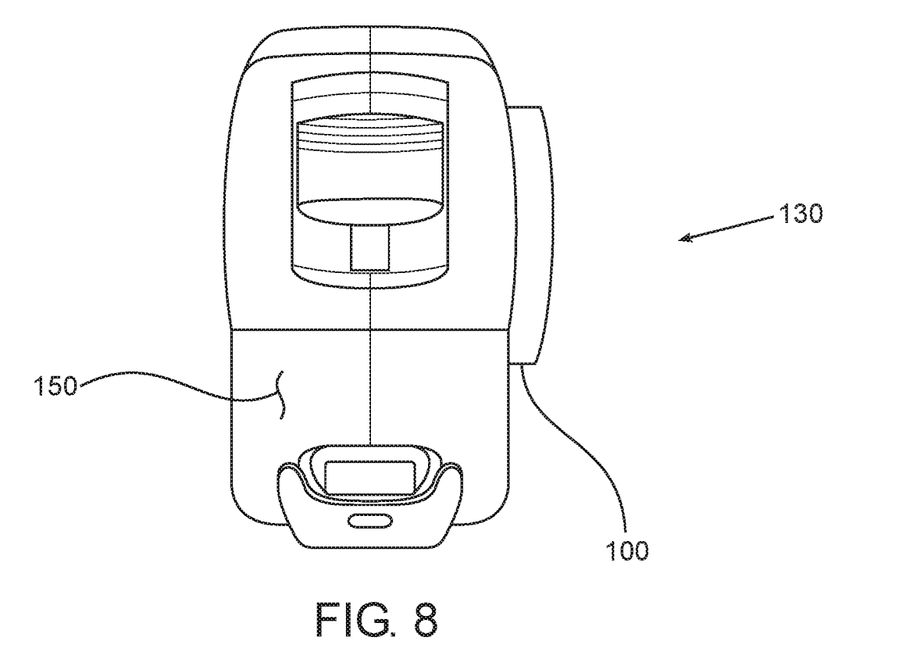
FIGS. 8-9 are photographs of an embodiment of the invention.
Figure 9:
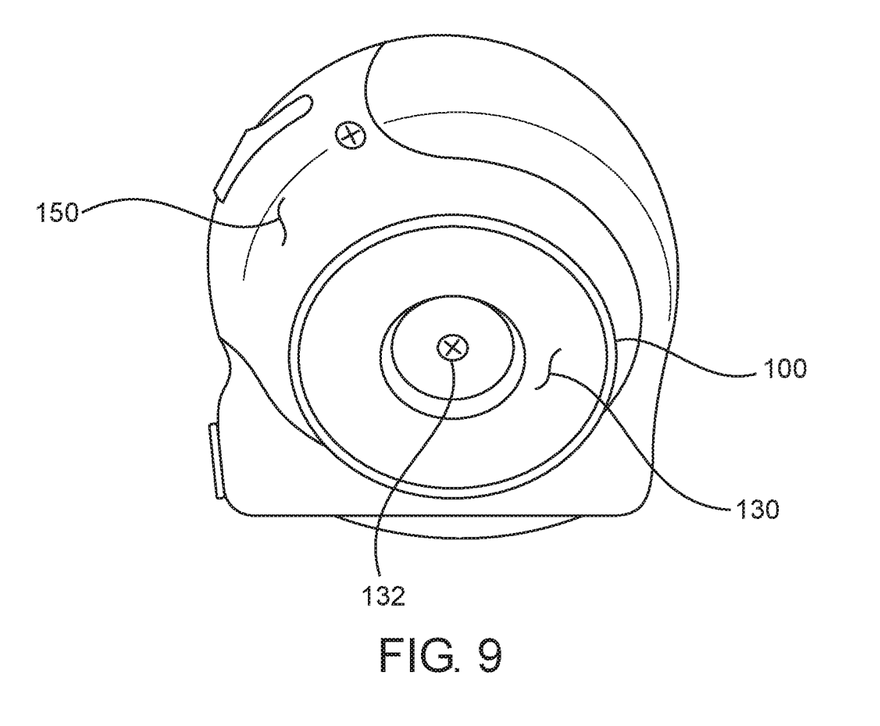

FIGS. 8-9 show another embodiment of the invention whereby a magnet 130 is shown within an outer housing 100. The outer housing 100 with the magnet 130 are shown attached to a tape measure 150 via a screw (fastening element) 132.

Figures 10, 11:
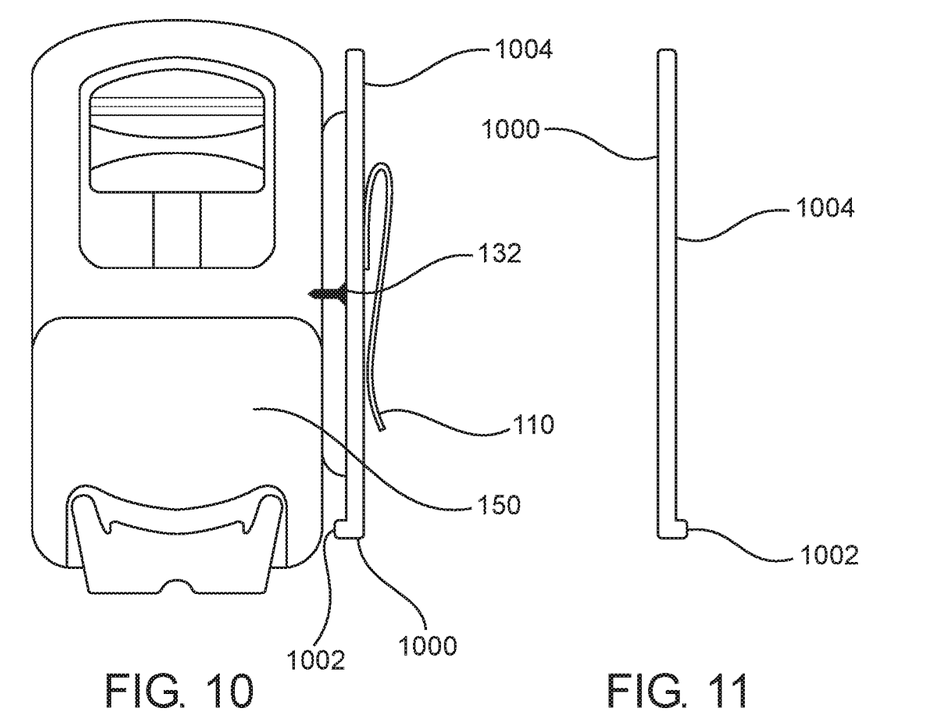
FIG. 10-13 are schematic sketches of embodiment of the invention.

FIGS. 10-13 show schematic diagrams of an embodiment of the invention. In FIG. 10, a tape measure 150 is shown having a small ridge 1002 on metal mounting clip plate 1000 for extra support, magnet 130, clip 110, metal mounting plate 120 and screw 132. Metal mounting clip plate 1000 further comprises planar portion 1004 as shown in FIG. 10.

In certain embodiments, the magnet 130 is screwed and glued to the housing body 100. In FIG. 11 the metal mounting clip plate 1000 is shown having a ridge 1002 on the bottom for extra support and for preventing the tape measure 150 from rotating during use. In certain embodiments, the clip plate 1000 prevents the tape measure from sliding off if attached to close to the edge and as a warning because user will notice it's put to low if it hits the ridge upon placement.

In certain embodiments, the circumference of the metal mounting clip plate 1000 has a ridge 1002 that extends out about ⅛ of an inch that is perpendicular to the metal mounting clip plate 1000.

In certain embodiments, the top of wait line list is ⅛ to ¼ inch from the top of the keeper plate.

Figure 12:
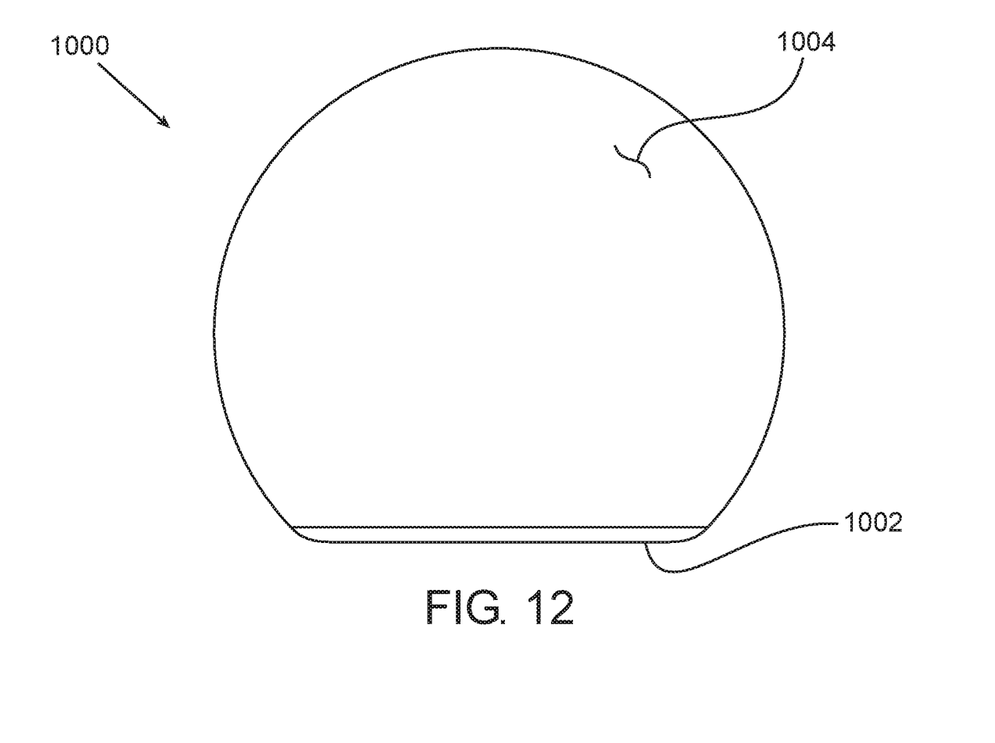

As shown in FIG. 12, in certain embodiments, the metal mounting clip plate 1000 may have rounded edges (no sharp edges), in order to avoid catching on a user's clothes.

Figure 13:
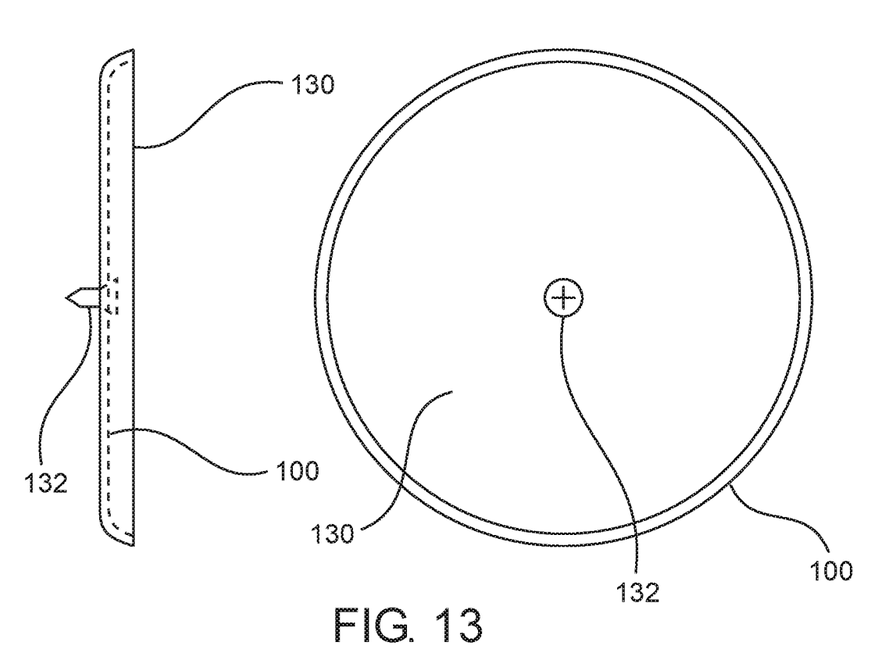

FIG. 13 shows a side view and front view of the magnet 130 and housing 100 in detail. As shown, the magnet 130 is located within the washer-like housing 100 and can use the existing screw 132 from the previous clip 110 to attach the magnet 130 and housing 100 to the tape measure 150. The magnet 130 is shown having a doughnut shape with the fastening device 132 located within the doughnut shape.

In certain embodiments, the invention includes a tape measure 150 that has had the clip 110 it normally comes with, unscrewed, taken off, and instead, has a magnet 130 put in the place where the clip 110 once was (a slightly longer screw and/or other fastening element 132 can be used according to aspects of the embodiments).

In certain embodiments, the magnet 130 has a metal washer assembly fused to it, on the side closest to the tape measure 150. The metal mounting clip plate 1000 can be slightly larger than the tape measure 150 from its side face view, and has a small one-eighth inch, 90° angle ridge 1002, angling away from the body, on the bottom edge as an added protection to keep it from it sliding off.

In certain embodiments, the clip 110 that would normally be on the tape measure 150 is fused to the metal mounting clip plate 1000 instead. The metal mounting clip plate 1000 is kept clipped to the waistline or clipped to a belt-line when a person wants to use the tape measure 150.

To use the tape measure 150, the user simply removes the tape measure 150 by rolling his or her wrist downward to disengage the top part of the magnet 130 first, following with the whole tape measure 150 coming off of the metal mounting clip plate 1000. To put the tape measure 150 back on, the user simply adheres the magnet 130 by directing the backside of the tape measure/magnet 150/130 toward the metal mounting clip plate 1000. The magnet 130 is drawn to the metal mounting clip plate 1000, causing it to adhere rather easily. The reason the metal mounting clip plate 1000 is a bit larger than the measuring tape 150, is so that the person using it doesn't have to have a perfect aim when magnetically attaching it to the metal mounting clip plate 1000 on their waist line or belt.

Figure 16:
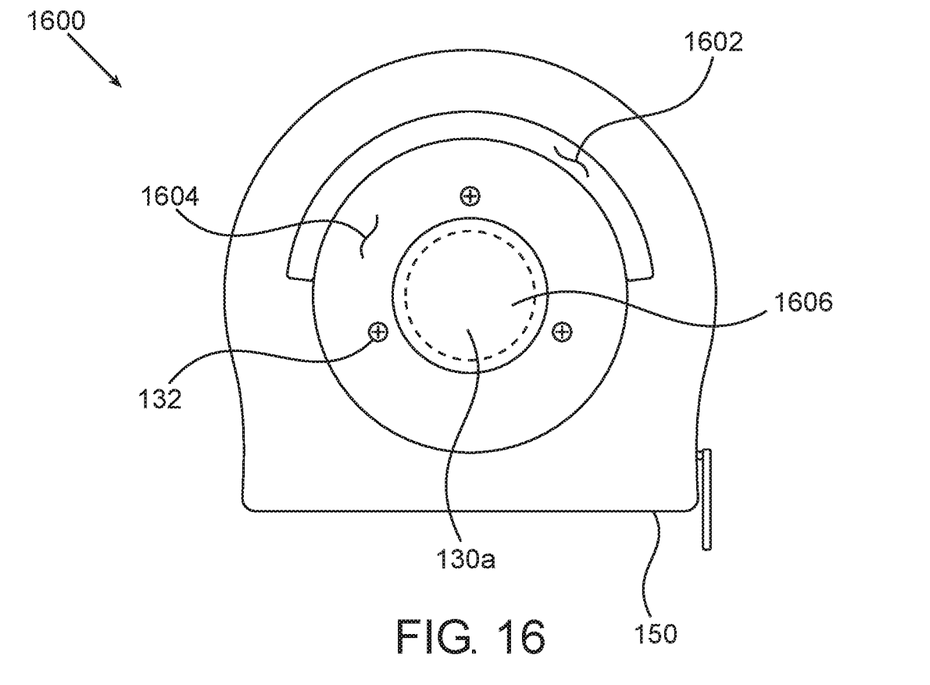
FIGS. 16-19 illustrate a further embodiment of the invention.
Figure 17:
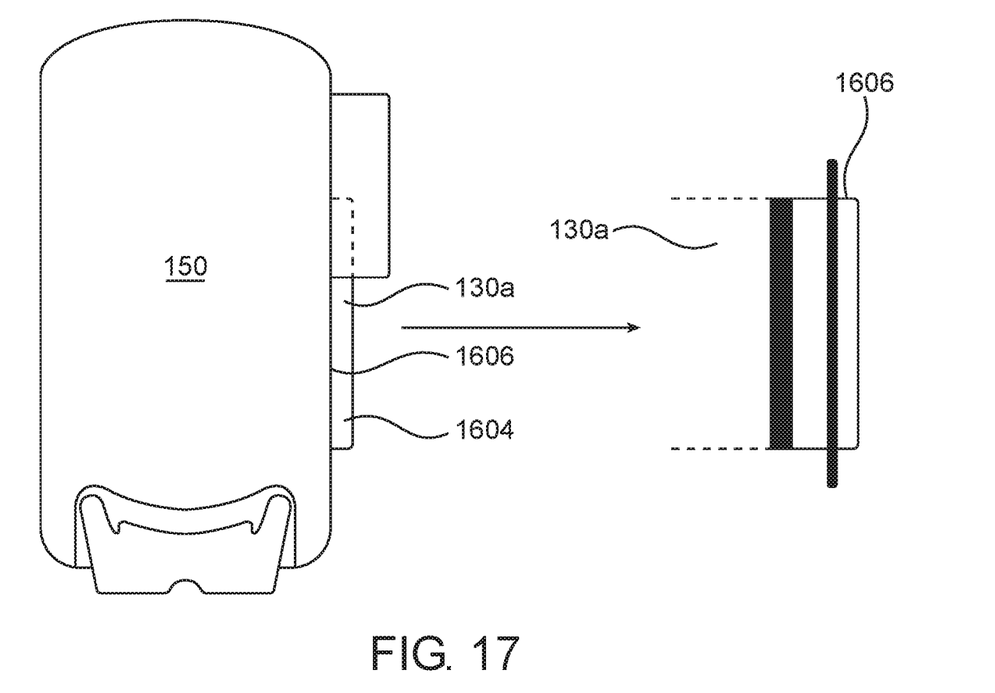
Figure 18:
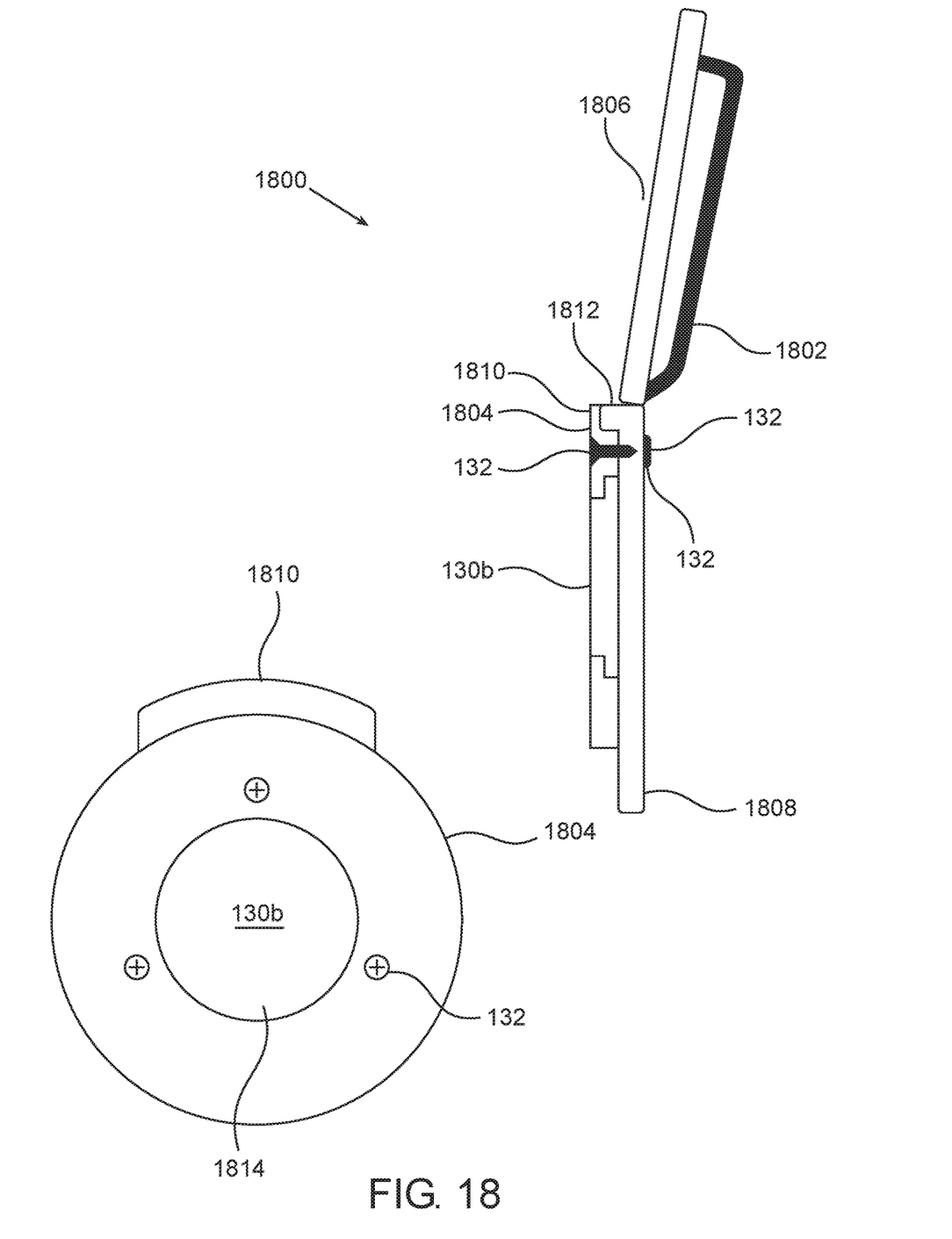

FIGS. 16-19 illustrate a further embodiment of the invention. FIG. 16 illustrates a front view of first assembly magnet-to-magnet tape measure retention means (first assembly) 1600 for magnetically removably retaining a tape measure 150 to a user via belt clip assembly 1800. First assembly 1600 comprises plastic shroud 1602, (plastic) magnetic housing 1604, and non-magnetic metal magnet retainer (retainer) 1606. In operation, the magnet-to-magnet tape measure retention means provides a first magnet 130a disposed on tape measure 150 via plastic housing 1604 and retainer 1606. As shown in FIG. 17, magnet 130a fits within retainer 1606. Retainer 1606 is substantially cylindrical in shape, and is sized to accept in a snug fit fashion first magnet 130a; retainer 1606 is comprised of a non-magnetic material such as aluminum (among many other non-magnetic metals that can be used), and has a lip that facilitates mounting onto tape measure 150. Located around retainer 1606 is plastic housing 1604 (note that housing 1604 can be fabricated from other similar lightweight materials, such as carbon composites, fiberglass, and the like, among many other types of materials that are also lightweight). Screws/retention means 132 are uses to secure the entire assembly to tape measure 150. Located in an upper portion, as shown in FIGS. 17 and 18 is shroud 1602, which provides an additional docking feature, as described in greater detail below.

Figure 19:
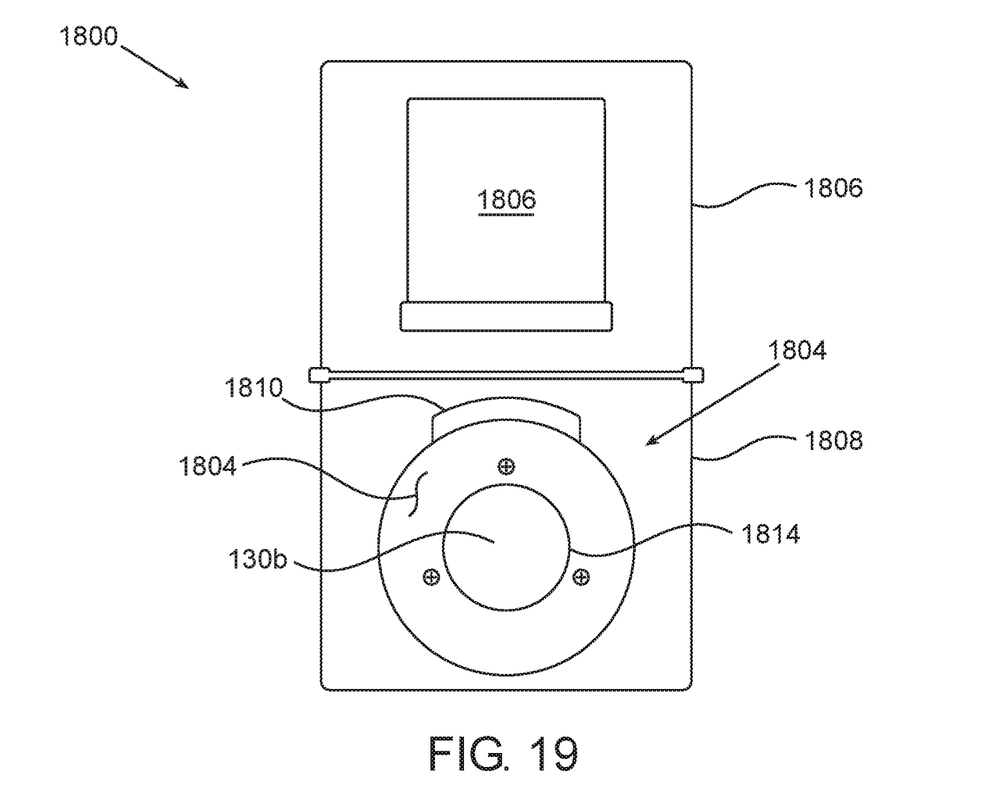

FIGS. 18 and 19 illustrate several views of belt clip assembly 1800 that comprises the second portion or second assembly of the magnet-to-magnet tape measure retention means. Belt clip assembly 1800 comprises clip 1802 that can fit on a belt or waist portion of a pair of pants. Belt clip assembly 1800 further comprises a bend between upper portion 1806 and lower portion 1808, so that lower portion 1808 extends outward and downwardly at such an angle that makes it relatively easier for a user to attach tape measure 150 with first assembly 1600 to lower portion 1808. Both upper and lower portions 1806, 1808 are substantially planar and of similar size.

Belt clip assembly 1800 further comprises plastic magnet housing 1804, which contains tab 1810, and recess 1812 formed about an inner surface of tab 1810. Recess 1812 and tab 1810 are designed to interface with an inner portion of shroud 1602; that is, shroud 1602 fits over tab 1810 and into recess 1812 in a tongue-and-groove fashion. Belt clip assembly 1800 further comprises second magnet 130b, which fits into housing 1804, and which is retained therein by non-magnetic metal magnet retainer (retainer) 1814. When a user moves first assembly 1600 so that shroud 1602 is moving into recess 1812, first magnet 130a and second magnet 130b are mutually attracted to each other, and this mutual attraction draws them together in substantial alignment and self-centering manner with relatively little effort by the user, and the two components attach to each other.

In certain embodiments, the tab does not it into the groove and rests against the shroud.

Figure 20A:
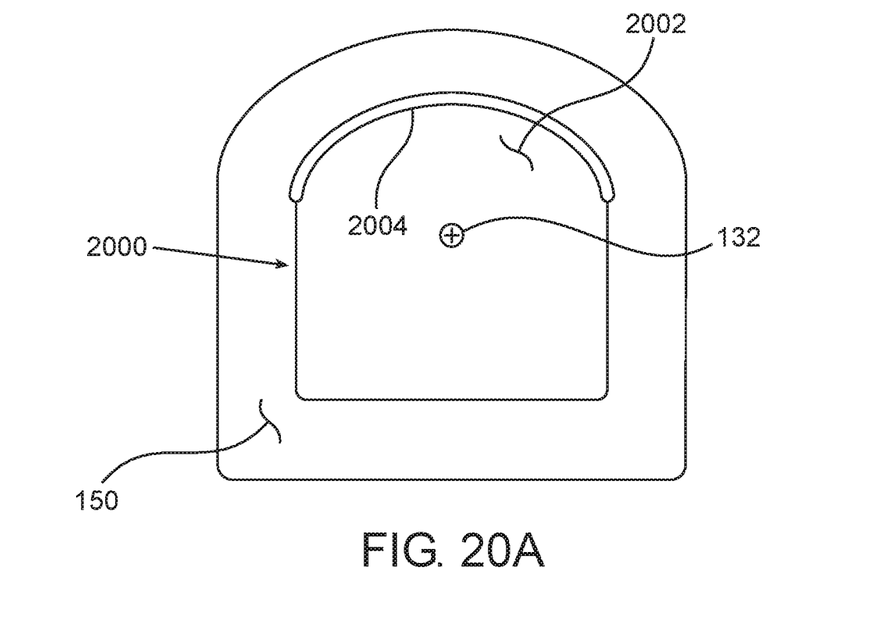

FIGS. 20A-22 illustrate a further embodiment of the invention. In FIG. 20A there is shown tape measure 150 with tape measure shroud plate (shroud plate) 2000 in a front view, and in FIG. 20B, there is shown tape measure 150, shroud plate 2000, and 1800 in a disassembled side view. Shroud plate 2000 comprises substantially planar portion 2002 and shroud portion 2004, and take the place of the clip 110 on tape measure 150. In configuration, shroud portion 2004 is substantially similar in shape, size and functionality to shroud 1602 as first shown in FIG. 16. According to aspects of the embodiments, shroud plate 2000 is attached to tape measure 150 via fastening element 132, in the manner shown in FIG. 20A.

Figure 20B:
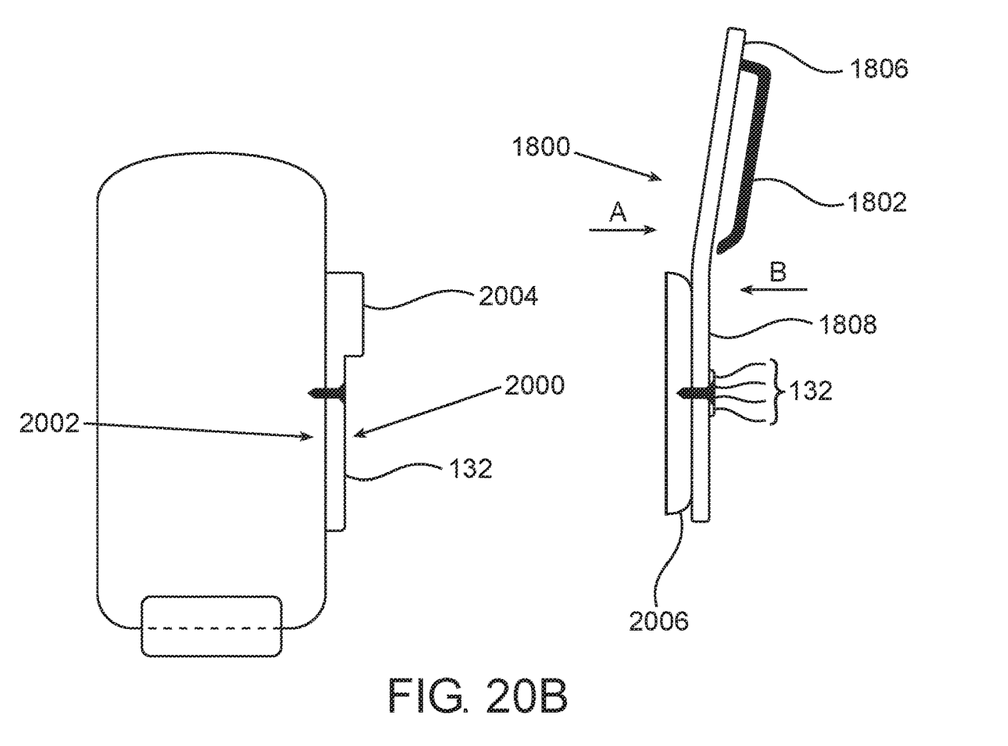
Figure 21:
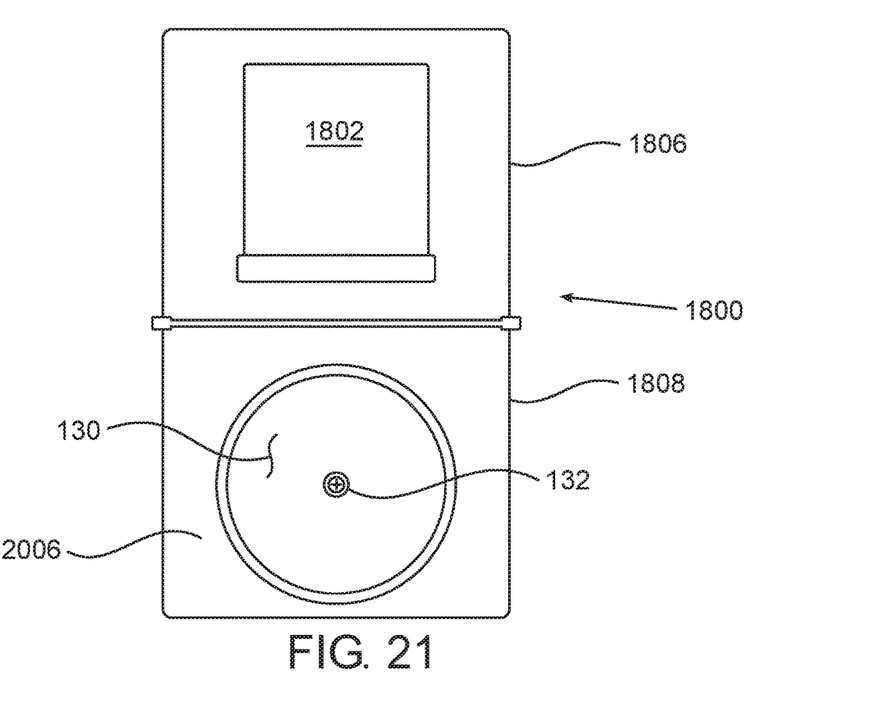
Figure 22:
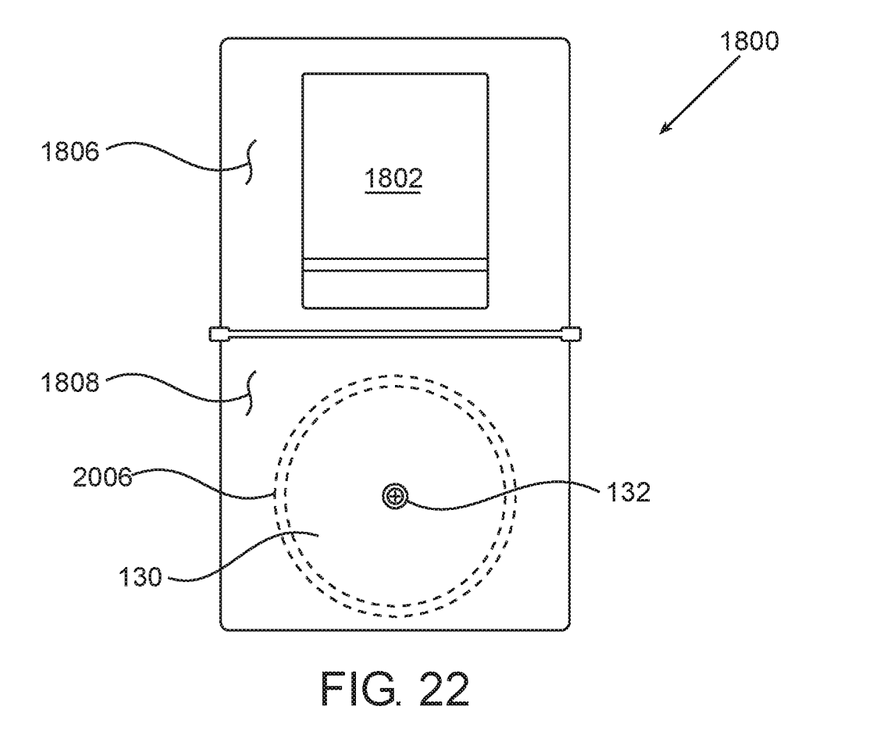

In FIG. 20B there is shown a side view of tape measure 150 with shroud plate 2000 attached thereto, with a modified belt clip assembly 1800. Belt clip assembly 1800 is modified in that non-magnetic metal magnet housing (housing) 2006 with magnet 130 located within has been added to it. Magnet 130 is contained in housing 2006 by epoxy, or other retention means, and provides a magnetic attaching force to attached tape measure 150 to belt clip assembly 1800, which is clipped onto a user's belt or pants in a substantially similar manner as described above in regard to FIGS. 16-19. Housing 2006 is attached to belt clip assembly by fastening element 132, which, in a non-limiting example, can be a screw, washers, and the like. Housing 2006 fits within shroud 2004 to facilitate securing of tape measure 150 to modified belt clip assembly 1800, and magnet 130 that is attached to modified belt clip assembly 1800 magnetically attaches to planar portion 2002 of shroud plate 2000. FIG. 21 illustrates a view in the direction of Arrow A in FIG. 20B, and FIG. 22 illustrates a view in the direction of Arrow B in FIG. 20B.

Figure 23:
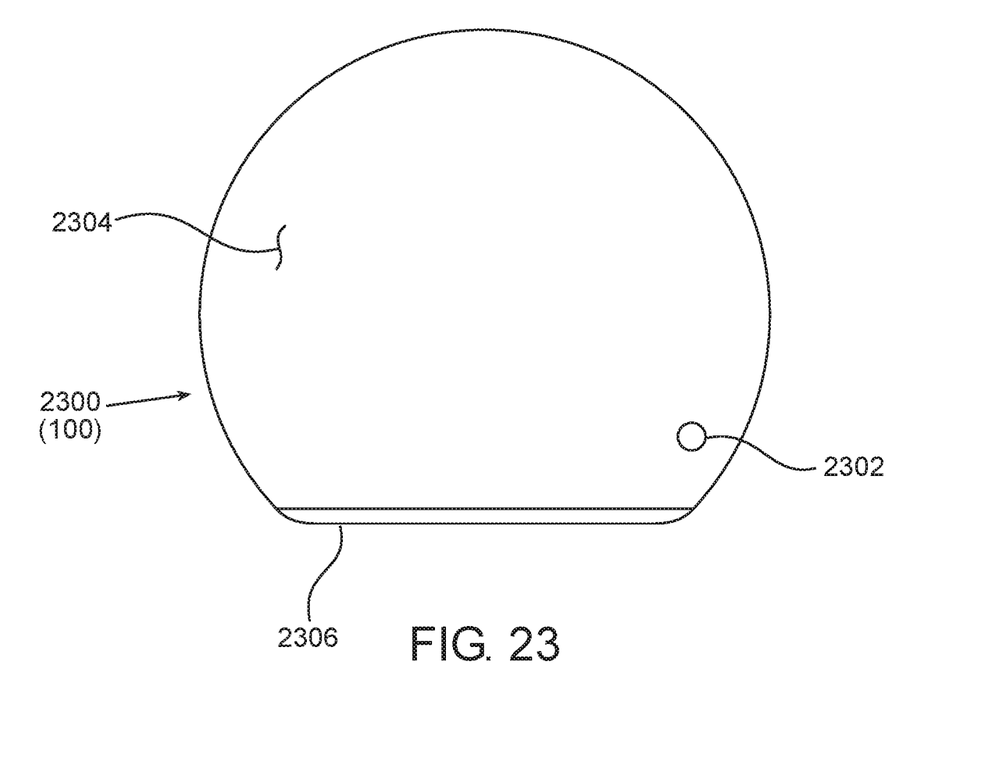
FIGS. 23-27 illustrate a further embodiment of the invention.
Figure 24:
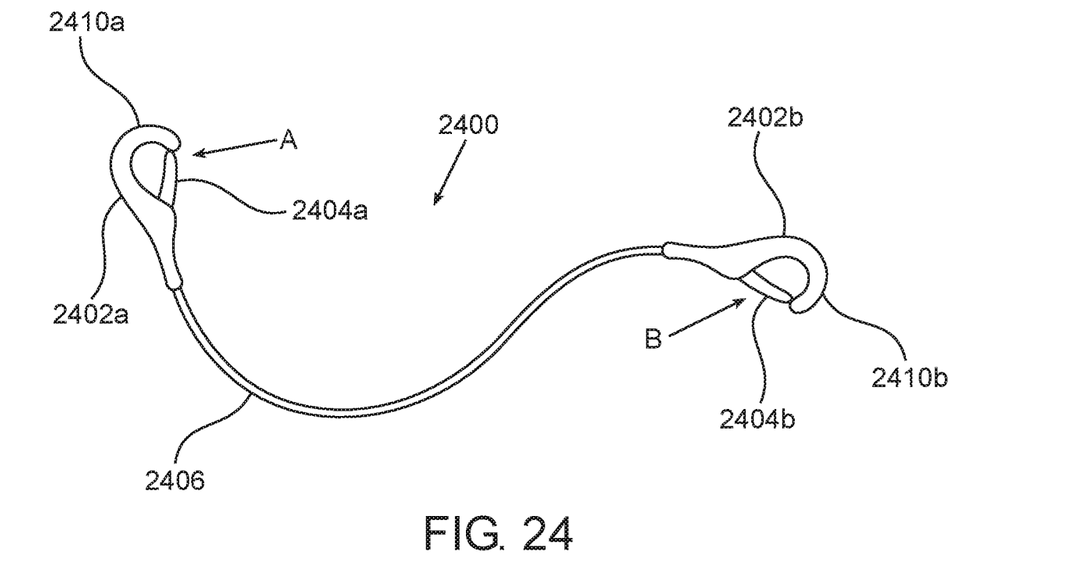

FIGS. 23-27 illustrate a further embodiment of the invention. FIG. 23 illustrates a front view of keeper plate 2300 according to aspects of the embodiments. Keeper plate 2300 comprises hole 2302, planar portion 2304, and ridge 2306, located at a bottom-most part of planar portion 2304. Keeper plate 2300 is similar in structure and function as metal mounting clip plate 1000 as shown in FIGS. 10-13. Located along the bottom part of planar portion 2304 is hole 2302. Hole 2302 is provided so that safety clip assembly 2400, which is shown in FIG. 24, can be attached to it and tape measure 150 as shown and described in regard to FIG. 27. Keeper plate 2300 can be attached to a user's belt or pants via clip 110 (shown in FIG. 25), in a manner as described above. Ridge 2306 maintains a lower part of keep plate 2300 away from tape measure 150 when attached thereto (via magnet 130 that is attached to tape measure 150, as in the embodiments of FIGS. 10-13), so that the user can clip safety clip assembly 2400 to keeper plate 2300 at hole 2302.

Figures 25, 26:
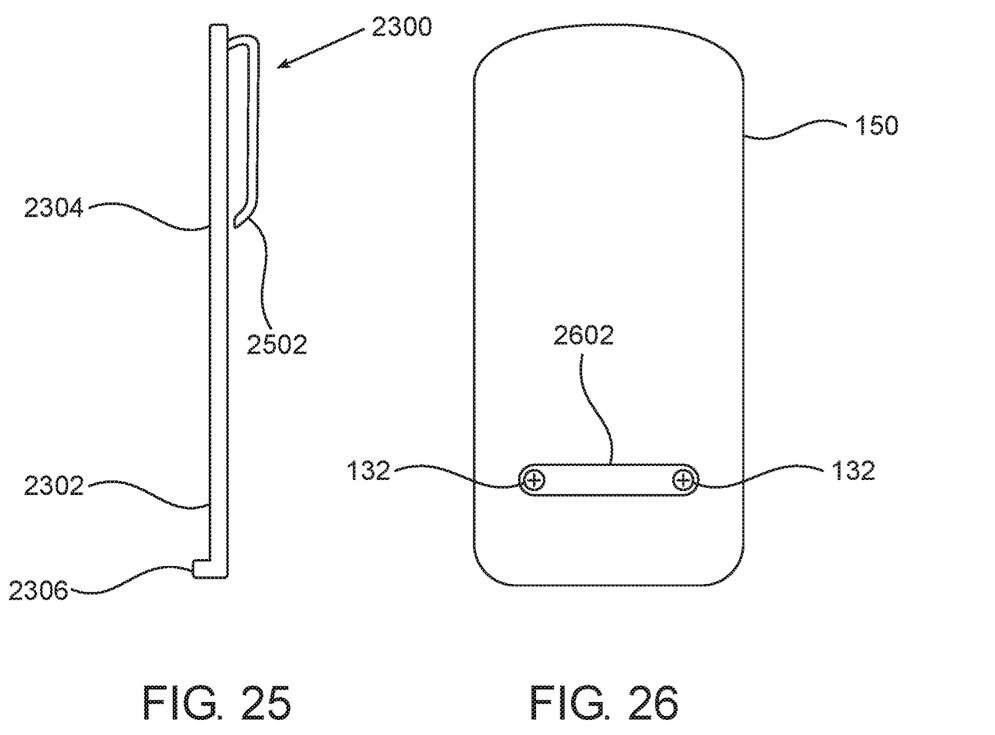

Referring now to FIG. 24, safety clip assembly 2400 comprises first and second clip assemblies 2410, each of which comprise first and second hooks 2400a,b, and hook-arms 2404a,b, respectively, and safety clip assembly 2400 further comprises cable 2406, which can be made of any length to accommodate normal actions of users. FIG. 25 illustrates a side view of keeper plate 2300, showing clip 2502, which keeps keeper plate 2300 affixed to the pants or belt of the user.

Figure 27:
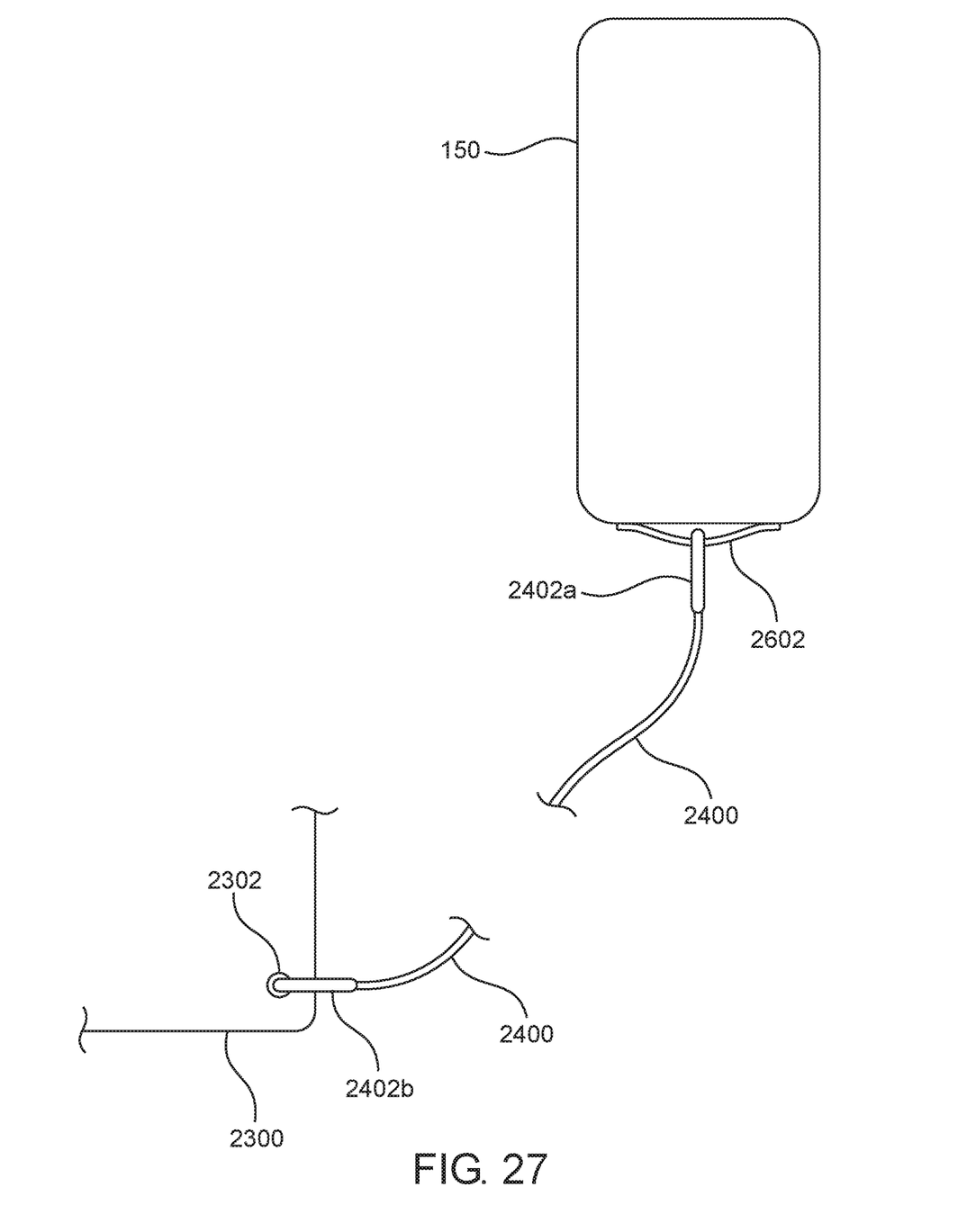

FIGS. 26 and 27 illustrates a rear and top view of tape measure 150 with clasp 2602 according to aspects of the embodiments. Claps 2602 is provided and affixed to tape measure 150 so that a user can secure tape measure 150 to keeper plate 2300 through the use of safety clip assembly 2400 according to aspects of the embodiments. As shown in FIG. 27, tape measure 150 can be removably but securely attached to keeper plate 2300 through use of safety clip assembly 2400; that is, a first hook 2402a and hook arm 2404a are manipulated in a known manner to attach a first end of safety clip assembly 2400 to tape measure 150 at clasp 2602, and a second end of safety clip assembly is attached to keeper plate 2300 at hole 2302 using second hook 2402b and hook arm 2404b. As those of skill in the art can appreciate, hook arms 2404a, b are spring loaded such that they rotate in the direction of Arrows A and B as shown in FIG. 24, and when released return to the retaining or closed state (which is as shown in FIG. 24).

In certain embodiments, the shroud plate is attached to the belt clip (welded, or screwed, or riveted, or screwed and glued or fused in any sufficient way) at ⅛ to ¼ from top edge of shroud plate on this original, and bottom tip of clip inside the belt or waistline goes down about 1½ to 2 inches and then 45's in the extension of approximately ¼ to ⅜ inch toward the body.

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

The invention claimed is:
1. A magnetic tape measure mount, comprising:
a housing having a magnet encompassed within the housing;
a fastening device configured to fasten the housing to the tape measure; and
a metal mounting plate, the magnet configured to be attached to the metal mounting plate to secure the housing and tape measure to the metal mounting plate,
wherein the metal mounting plate includes a ridge at the bottom of the metal mounting plate, so that the housing is secured against the metal mounting plate and is held in place by the ridge to prevent the tape measure from being dislodged and/or rotating,
wherein the ridge extends perpendicularly to the metal mounting plate, and
wherein the metal mounting plate is round with a flat bottom edge.

2. The magnetic tape measure mount of claim 1, wherein the metal mounting plate includes a clip configured to attach the metal mounting plate to a user's waistline/belt line, or work belt.

3. The magnetic tape measure mount of claim 2, wherein the clip is welded or riveted to the metal mounting plate.

4. The magnetic tape measure mount of claim 1, wherein the ridge completely surrounds the tape measure.

5. The magnetic tape measure mount of claim 1, wherein the magnet has a doughnut shape.

6. The magnetic tape measure mount of claim 1, wherein the proximal side of the housing abuts the tape measure, and the distal side of the housing faces the metal mounting plate.

7. The magnetic tape measure mount of claim 1, wherein the metal mounting plate has a surface area larger than the magnet.

8. The magnetic tape measure mount of claim 1, wherein the fastening device is a screw.

9. The magnetic tape measure mount of claim 1, wherein the housing includes a washer-type shape.

10. The magnetic tape measure of claim 1, wherein the magnet includes enough strength to attach to the metal mounting plate during use and wear of the tape measure.

11. A kit to retrofit an existing tape measure, the kit comprising:
a housing having a magnet encompassed within the housing;
a fastening device configured to fasten the housing to an existing tape measure; and
a metal mounting plate, the magnet configured to be attached to the metal mounting plate to secure the housing and tape measure to the metal mounting plate,
wherein the metal mounting plate includes a ridge at the bottom of the metal mounting plate, so that the housing is secured against the metal mounting plate and is held in place by the ridge to prevent the tape measure from being dislodged and/or rotating,
wherein the ridge extends perpendicularly to the metal mounting plate, and
wherein the metal mounting plate is round with a flat bottom edge.

12. A magnetic tape measure mount, comprising:
a first housing having a first magnet encompassed within the first housing;
a fastening device configured to fasten the first housing to the tape measure, the fastening device including a metal mounting plate, the magnet configured to be attached to the metal mounting plate to secure the housing and tape measure to the metal mounting plate, wherein the metal mounting plate includes a ridge at the bottom of the metal mounting plate, so that the housing is secured against the metal mounting plate and is held in place by the ridge to prevent the tape measure from being dislodged and/or rotating, wherein the ridge extends perpendicularly to the metal mounting plate, and wherein the metal mounting plate is round with a flat bottom edge; and
a belt clip assembly comprising an upper portion and a lower portion, the lower portion comprising a second magnet, and wherein
the first and second magnet are configured to be attracted to each other and self-center the tape measure to the second magnet.

13. The magnetic tape measure mount of claim 12, further comprising:
an arc-shaped shroud located on an upper portion of the first housing; and
a second housing for the second magnet, the second housing comprising
an arc shaped tab, the arc shaped tab of substantially similar size as the arc-shaped shroud, and the arc-shaped tab forming a recess with a surface of the lower portion of the belt clip assembly, and within which a portion of the shroud can interface and interlock with.

14. The magnetic tape measure mount of claim 12, wherein the upper portion of the belt clip assembly is formed at an angle in regard to the lower portion.

15. The magnetic tape measure mount of claim 12, wherein the belt clip assembly comprises a clip attached to the upper portion and configured to attach the belt clip assembly to a user's waistline/belt line or work belt.

16. The magnetic tape measure of claim 12, wherein the first housing is substantially cylindrical in shape, and configured to accept the first magnet within an interior portion of the first housing.

* * * * *